(12) United States Patent
Guzick, Jr.

(10) Patent No.: US 6,496,109 B1
(45) Date of Patent: Dec. 17, 2002

(54) ALTERNATOR-CHARGING SYSTEM FAULT DETECTOR

(76) Inventor: Edward Guzick, Jr., 1162 Tolworth Dr., San Jose, CA (US) 95128

( * ) Notice: Subject to any disclaimer, the term of this patent is extended or adjusted under 35 U.S.C. 154(b) by 0 days.

(21) Appl. No.: 09/916,401

(22) Filed: Jul. 26, 2001

Related U.S. Application Data

(60) Provisional application No. 60/249,042, filed on Nov. 14, 2000.

(51) Int. Cl.$^7$ ................................................ B60Q 1/00
(52) U.S. Cl. .................... 340/455; 340/450.3; 340/459; 340/461; 340/517; 340/520
(58) Field of Search ................................. 340/455, 451, 340/449, 450.3, 459, 461, 500, 501, 517, 520, 521, 522, 438, 439; 320/156, 157, DIG. 13

(56) References Cited

U.S. PATENT DOCUMENTS

| | | | |
|---|---|---|---|
| 4,053,868 A | * 10/1977 | Cox et al. .................... 340/648 |
| 4,184,146 A | * 1/1980 | Fratzke et al. ............... 340/517 |
| 5,252,926 A | * 10/1993 | Menegoli ..................... 324/545 |
| 5,646,510 A | * 7/1997 | Kumar ......................... 322/16 |
| 5,646,599 A | * 7/1997 | Adachi ........................ 340/648 |
| 6,194,877 B1 | * 2/2001 | Judge et al. .................. 322/28 |

* cited by examiner

Primary Examiner—Daniel J. Wu
Assistant Examiner—Toan Pham
(74) Attorney, Agent, or Firm—Fish & Richardson P.C.

(57) ABSTRACT

A method and system is provided for detecting a charging system fault in a motor vehicle. The motor vehicle includes an existing warning indicator driven by a first signal for indicating when one aspect of the motor vehicle performance is faulty. The method includes detecting a charge system fault, determining if the one aspect of the motor vehicle's performance is faulty and, if so, driving the existing warning indicator with the first signal. If the one aspect is not faulty and a charge system fault has been detected, the method includes driving the existing warning indicator with a second signal corresponding to the detected charge system fault. The second signal provides a different visual indication than the first signal.

18 Claims, 3 Drawing Sheets

JG 100
Block Diagram

ALTERNATOR-CHARGING SYSTEM FAULT DETECTOR

This application claims the benefit of U.S. Provisional application No. 60/249,042, filed Nov. 14, 2000.

The present invention relates generally to electrical circuits.

BACKGROUND

Motor vehicles include warning systems for providing audible, visible or other warning indications to a motor vehicle operator of a problem condition related to the performance of the motor vehicle. Often, the warning system include s a display panel that has indicators for signaling of fault conditions. Each indicator traditionally has a single function, warning against a particular condition that has been detected by the warning system.

A conventional display panel is limited in size. As a practical matter, the number of faults that can be detected in the complex motor vehicles of today far exceed the amount of space available in a conventional display panel. In some motor vehicles, such as motorcycles, the size of the display panel is severely restricted. Accordingly, conventional warning systems group similar faults creating generalized system level warning indicators (e.g., oil pressure, temperature, battery etc.) Users are alerted to the system level event and respond in accordance with operator instructions. In general, the warning system provides rudimentary information that must be investigated further as to its ultimate cause and correction. While the information is rudimentary, the value is often quite significant. If the motor vehicle operator chooses to disregard the detected fault, permanent damage to the motor vehicle and/or its systems can result.

SUMMARY

In one aspect, the invention provides a fault detector for determining a charge system fault in a motor vehicle charging system using an existing warning indicator on a display panel of the motor vehicle. The fault detector includes a charge isolator receiving as an input a signal indicative of the charge voltage provided from an alternator of the motor vehicle to the battery, a charge power loss detector operable to determine when a voltage level of the input signal is less than a predetermined threshold, a flasher operable to generate a pulsed signal if the voltage level of the in put signal is less than the predetermined threshold and signaling logic operable to transmit the pulsed signal to an existing warning indicator on a display panel of the motor vehicle, detect a fault associated with the existing warning signal and prioritize between the fault and the charge system fault including selecting a higher priority fault to drive the existing warning indicator.

Aspects of the invention can include one or more of the following features. The fault detector can include a flasher timer for controlling a duty cycle of the pulsed signal. The fault detector can include motor vehicle shut-off logic for detecting when the motor vehicle is not operating, and flasher power shut-off logic for shutting down the flasher when the motor vehicle is not operating. The fault detector can include a flasher amplifier operable to receive the pulsed signal and drive the existing warning indictor at a steady rate. The flasher can be an integrated circuit. The fault detector can be a CMOS integrated circuit operating as a monolithic timer in an a stable configuration. The motor vehicle can be a motorcycle, snowmobile, Altra-lite aircraft, or motorboat. The existing warning indicator can be a low oil pressure indicator. The charge isolator can be a rectifier isolation diode. The signaling logic can be operable to transmit the pulsed signal to an existing warning indicator on a display panel of the motor vehicle if a charge system fault is detected and disable the transmission of the pulsed signal to the existing warning signal if the fault associated with the existing warning indicator is detected. The fault associated with the existing warning indicator can be a low oil pressure fault. The oil pressure fault can have a higher priority than a charging system fault. The charger isolator can be operable to isolate the charging system from the motor vehicle's load and a battery. The charger isolator can be operable to current limit received signals. The existing warning indicator can be selected from the group of a low oil pressure indicator, a high oil temperature indicator, a high water temperature indicator and a low fuel indicator.

In another aspect, the invention provides a method for detecting a charging system fault in a motor vehicle. The motor vehicle includes a low oil pressure warning indicator for indicating when oil pressure for the motor vehicle is too low. The method includes detecting a charge system fault, determining if the oil pressure is too low, and if so, driving the low oil pressure warning indicator with a first signal. If the oil pressure is within an acceptable range, and if a charging system fault is detected, the method includes driving the low oil pressure warning indicator with a second signal that is distinct from the first signal used to drive the low oil pressure warning indicator when oil pressure is too low.

In another aspect, the invention provides a method for detecting a charging system fault in a motor vehicle. The motor vehicle includes an existing warning indicator driven by a first signal for indicating when one aspect of the motor vehicle performance is faulty. The method includes detecting a charge system fault, determining if the one aspect of the motor vehicle's performance is faulty and, if so, driving the existing warning indicator with the first signal. If the one aspect is not faulty and a charge system fault has been detected, the method includes driving the existing warning indicator with a second signal corresponding to the detected charge system fault. The second signal provides a different visual indication than the first signal.

Aspects of the invention can include one or more of the following advantages. A self-contained, hermetically sealed, alternator-charging system fault detector for any battery charging system is proposed. The battery charging system can be included on a motorcycle snowmobile, motorboat, Altra-lite aircraft and the like. The alternator-charging system utilizes existing vehicle wiring and fault displays. A fault detector uses a single, instrument panel mounted, indicator (e.g., low oil pressure light) for two operational meanings. In a first operational mode, the fault detector operates to detect an alternator low voltage output condition. Upon detecting the alternator low voltage output, the fault detector operates to cause the flashing of the (low oil pressure) indicator. In a second operational mode, when a loss of oil pressure is detected, the oil pressure indicator is illuminated steadily. Both of the fault modes indicate a very serious condition, however, the engine having low oil pressure is generally deemed to be of a more critical nature. A system is provided for prioritizing among the plurality of faults associated with a single fault indicator, and includes a priority indication to distinguish the higher priority fault in the event of a dual system failure.

DETAILED DESCRIPTION

Figure 1:
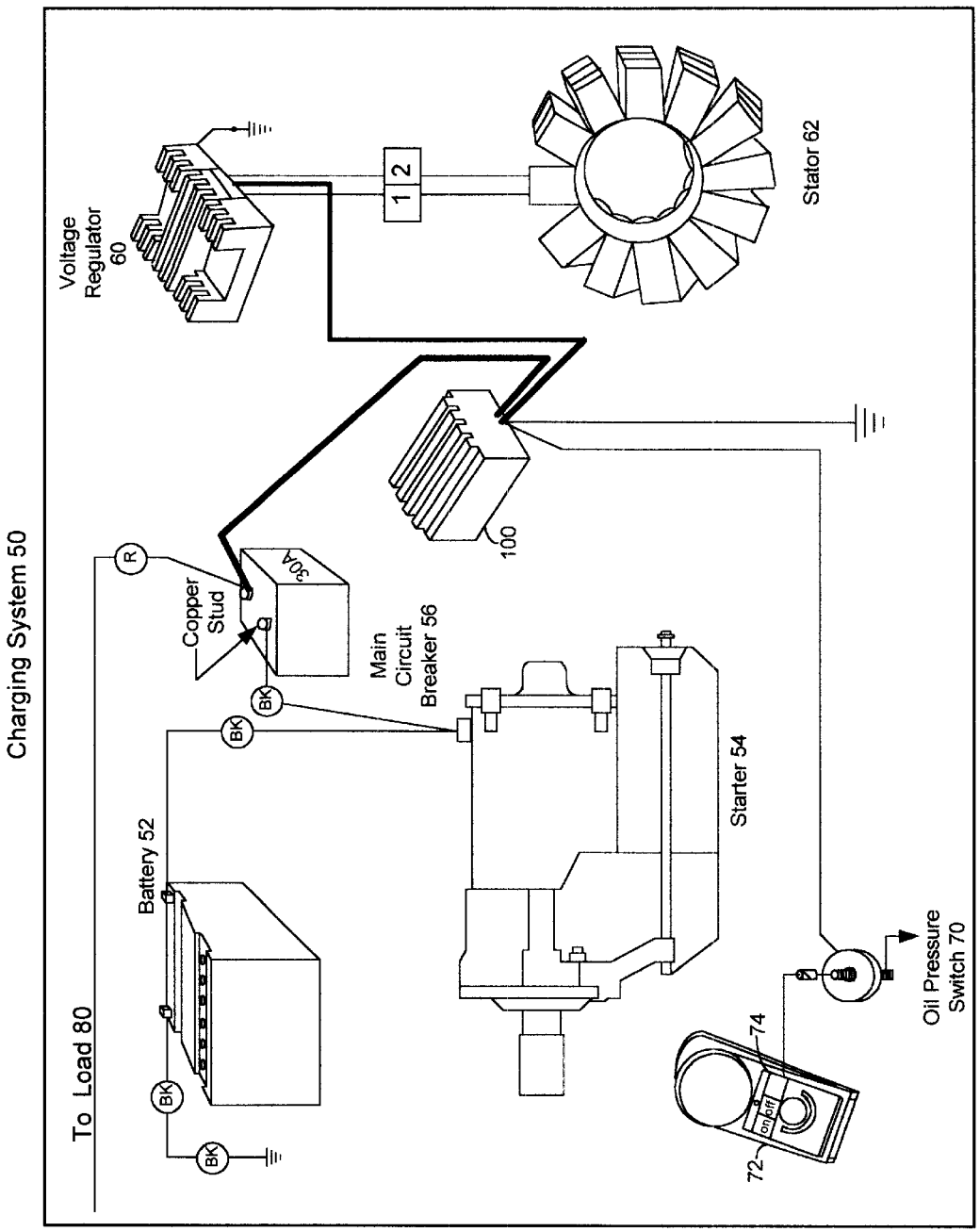
FIG. 1 shows a charging system including alternator-charging system fault detector.

Referring now to FIG. 1, a charging system 50 that includes an alternator-charging system fault detector (i.e., "fault detector") 100 is shown. The charging system 50 can be part of a conventional motor vehicle charging system included, for example on a Harley Davidson Motorcycle (not shown). The charging system 50 includes a battery 52, switch 54, main circuit breaker 56 and an alternator (portions of which are shown including voltage regulator 60 and stator windings 62). Portions of a warning system for the motor vehicle are shown including an oil pressure switch 70 and display panel 72 including oil pressure indicator 74.

Figure 2:
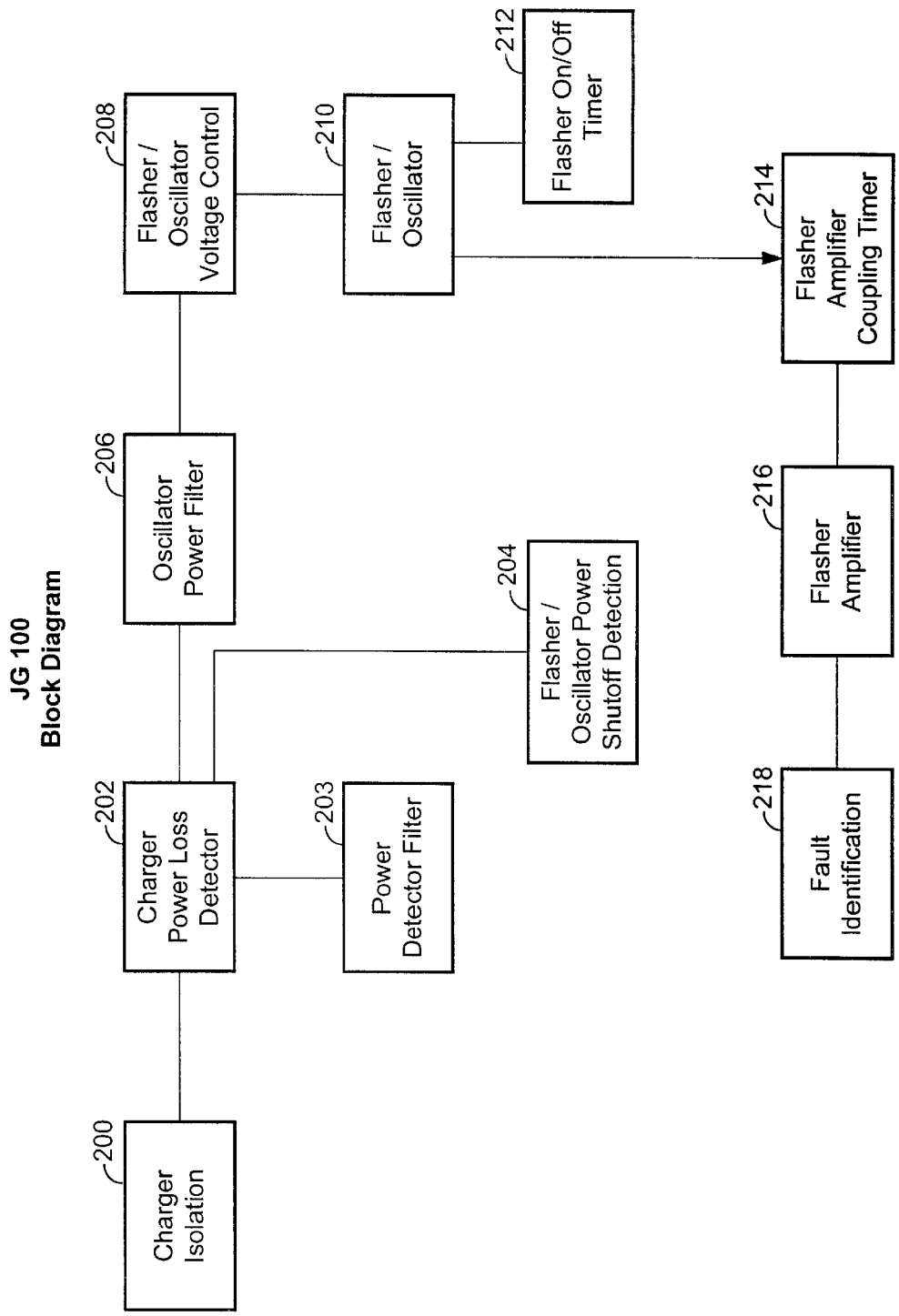
FIG. 2 shows a schematic block diagram of a fault detector.

Referring now to FIG. 2, a schematic block diagram of the fault detector 100 is shown. Fault detector 100 includes a charger isolator 200, charger power loss detector 202, oscillator power filter 206 and flasher (e.g., oscillator) 210. Associated with power loss detector 202 are a power detector filter 203 and flasher shut off logic 204. Associated with flasher 210 are power filter 206, voltage controller 208, timer 212, amplifier coupling timer 214, amplifier 216, and fault indicator block 218.

Fault detector 100 isolates the charging system 50 from the vehicle's electrical load 80 and battery 52 through charger isolation 200. Charger isolation 200 also provides a half wave rectifier filter and current limiter to protect and prevent against alternator or vehicle electrical system damage.

Charger power loss detector 202 receives an input from the motor vehicle's alternator. Charger power loss detector 202 detects a low voltage condition from the output of the alternator (i.e., the alternator output voltage drops below the minimum battery charging level). Upon detection of a low output voltage condition, charger power loss detector 202 powers flasher 210 through flasher power filter 206 and flasher voltage control 208. Associated with charger power loss detector 202 are one or more power detector filters 203 for filtering the alternator output voltage. In one implementation, the power detector filters 203 are low pass network filters.

Flasher power shutoff detector 204 determines the vehicle operating status as to whether the vehicle is running with no charger output (i.e., an alternator fault) or the vehicle is not running (i.e., turned off with no charger output). Flasher power shutoff detector 204 prevents battery discharge through the fault detector 100 by the operation of flasher 210 while the vehicle is not running (i.e., with no alternator output, the normal engine shutoff condition).

Flasher 210 can be a CMOS (complementary metal-oxide semiconductor type) integrated circuit (IC) operating as a monolithic timer in an astable configuration. Flasher control timing is controlled by the flasher on/off timer 212. In one implementation, the flasher on/off timer 212 causes flasher 210 to oscillate at a rate of approximately 2.18 cycles per second. Flasher amplifier coupling timer 214 controls the timing of turning on and off of flasher amplifier 216. In one implementation, flasher amplifier coupling timer 214 controls the flasher amplifier 216 at a duty cycle of approximately 0.3 seconds on, and 0.15 seconds off.

Flasher amplifier 216 provides an output signal to fault indicator block 218, which in turn provides a fault indication to an indicator on a display panel on the motor vehicle (e.g., the vehicle's low oil pressure indicator).

Operation

Fault detector 100 operates on the prioritizing fault principal by alerting the operator of a charging system malfunction. Fault detector 100 detects a charging system failure using a power loss detector 202 and alerts the operator of the motor vehicle (e.g., rider of the motor cycle) that the motor vehicle is operating on limited battery power only. The flashing oil pressure indicator driven by flasher 210 (resulting in a flashing oil pressure indicator on the display panel of the motor vehicle) alerts the operator that the vehicle is operating on limited battery power. The limited battery power warning can provide the motor vehicle operator with sufficient notice to have the motor vehicle serviced without the added inconvenience of a breakdown. For example, with a nominal battery and load, a motorcycle rider can expect as much as 10 hours of motorcycle running, or nearly 600 miles of highway riding after a charge system malfunction has been detected. Results will vary depending on the condition of the battery and the amount of added electrical load on the system.

If the engine oil pressure should drop below the manufacture's preset limit, fault detector 100 will illuminate the low oil pressure indicator steadily (irrespective of a charging system malfunction). The steady illumination of the low-pressure indicator alerts the rider of an engine oil system failure (opposed to flashing, which indicates charging system malfunction). Since the oil system is more important (or a higher priority) than battery charging, fault detector 100 prioritizes the faults and provides an indication of the higher priority system failure. If at any time the oil pressure should come back within limits, then fault detector 100 will provide a charging system failure indication (with a flashing low oil pressure light) again.

Figure 3:
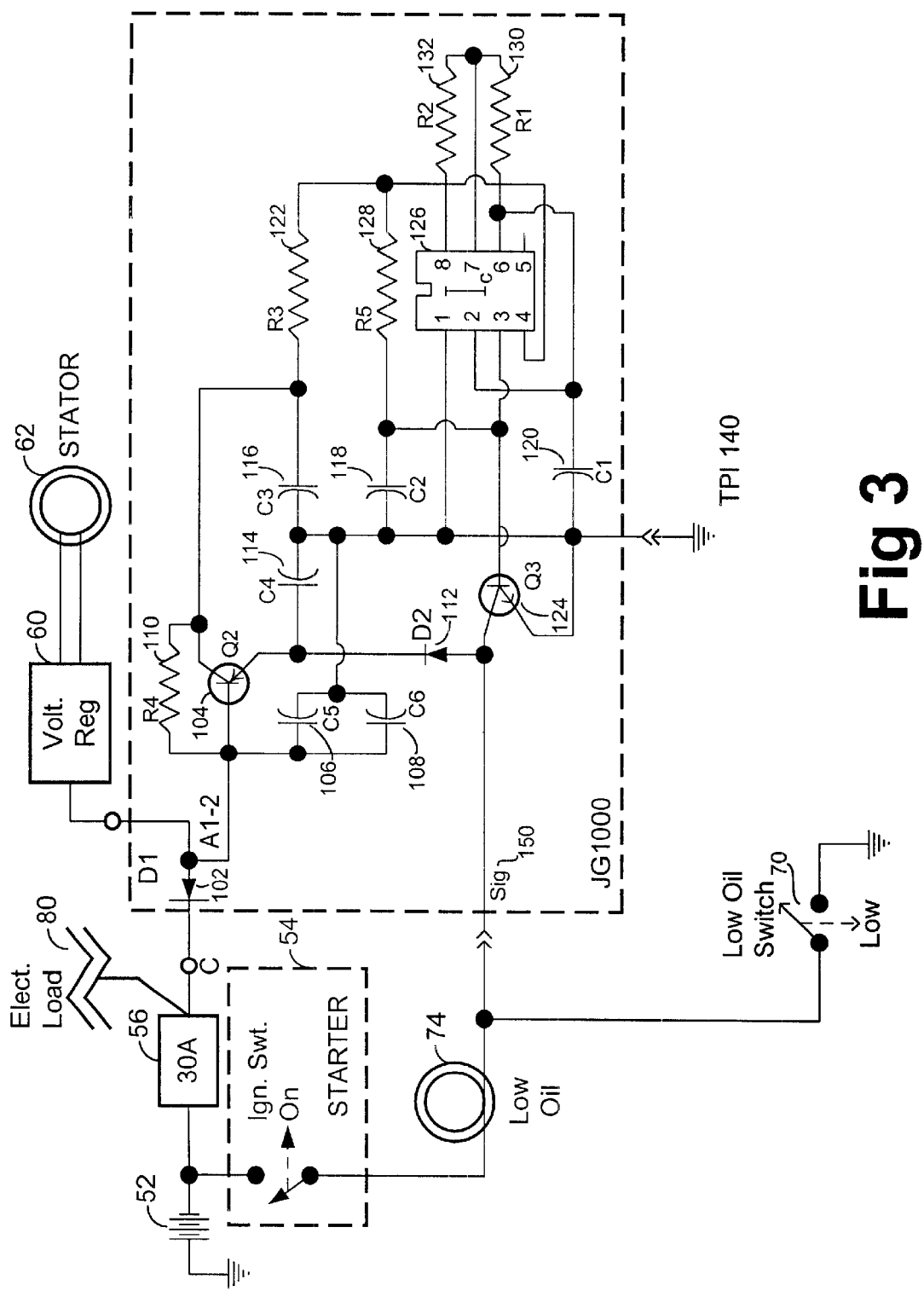
FIG. 3 shows a detailed electrical schematic for one implementation of a fault detector.

Referring now to FIGS. 2 and 3, a more detailed view of one implementation of fault detector 100 is shown. In the implementation shown, fault detector 100 includes a plurality of components including a pair of transistors (Q2 and Q3), a pair of diodes (D1 and D2), six capacitors (C1–C6), five resistors (R1–R5) and an integrated circuit (IC).

Fault detector 100 isolates the charging system 50 from the vehicle's battery 52 and electrical load 80 through a rectifier and isolation diode 102 (D1). In one implementation, rectifier and isolation diode 102 (D1) is a 32-ampere rectifier and isolation diode. A first terminal (A1-2) of rectifier and isolation diode 102 is coupled to the output of the voltage regulator 60. A second terminal (A1-1) of rectifier and isolation diode 102 is coupled with to one terminal of the main circuit breaker 56, the second terminal of which is coupled to battery 52. Rectifier and isolation diode 102 provides charger system isolation and is used as a half wave rectifier filter and current limiter to protect and prevent against alternator or vehicle electrical system damage.

Integrated circuit (IC) 126 is a flasher circuit that includes a plurality of inputs. The integrated circuit can be a CMOS (complementary metal-oxide semiconductor) type device operating as a monolithic timer in an astable configuration.

First terminal A1-2 of rectifier and isolation diode 102 is coupled to the base of a transistor 104 (Q2), a first terminal of first capacitor 106 (C5), a first terminal of a second capacitor 108 (C6) and first terminal of a first resistor 110 (R4). The collector of transistor 104 (Q2) is coupled to a second terminal of first resistor 110 (R4). The emitter of transistor 104 (Q2) is coupled to a first terminal of diode 112 (D2) and to the first terminal of a third capacitor 114 (C4). The second terminal of the second diode 112 (D2) is coupled to the collector of a second transistor 124 (Q3) and to the low oil pressure indicator 74 via a signaling port 150 of fault detector 100. The collector of the first transistor 104 (Q2) is also coupled to the first terminal of a fourth capacitor 116 (C3) and the first terminal of a second resistor 122 (R3). The base of second transistor 124 (Q3) is coupled to a first terminal of a third resistor 128 (R5), the first terminal of a fifth capacitor 118 (C2) and the third input to integrated circuit 126.

The second terminals of the second and third resistors 122 and 128 (R3 and R5) are coupled to the fourth input of integrated circuit 126. A first terminal of each of a fourth and fifth resistor 130 and 132 (R1 and R2) are coupled to the seventh input of integrated circuit 126. The second input to the integrated circuit 126 is coupled to the first terminal of sixth capacitor 120 (C1), the sixth input to the integrated circuit 126 and a second terminal of fourth resistor 130 (R1). The second terminal of fifth resistor 132 (R2) is coupled to the eighth input of integrated circuit 126.

The second terminal of third capacitor 114 (C4), the first terminal of fourth and fifth capacitors 116 and 118 (C3 and C2), the second terminals of first and second capacitors 106 and 108 (C5 and C6), the second terminal of sixth capacitor 120 (C1), the emitter of second transistor 124 (Q3) and the first input to integrated circuit 126 are all coupled via a ground port 140 to ground.

Operation

When the alternator output voltage drops below the minimum battery charging level, tap A1-2, on the anode side of diode D1 (first diode 102) goes low driving the base side of transistor Q2 (first transistor 104) into the forward bias state, allowing current flow from the battery 52, through the vehicle's ignition switch (i.e., switch 54), the low oil pressure indicator 74 and diode D2 (second diode 112), to turn on the power loss detector Q2 (first transistor 104).

The power loss detector transistor Q2 (first transistor 104), being forward biased in a common emitter circuit by resistor R4 (first resistor 110), supplies system operating voltage to the flasher (IC 126). Diode D2 (second diode 112), the flasher power shutoff detector, determines the vehicle operating status as to whether it is running with no charger output (i.e., an alternator fault), or not running (i.e., turned off, with no charger output) to prevent battery discharge through fault detector 100 from the flasher (IC 126) operating while the motor vehicle is not running (i.e., with no alternator output, the normal engine shutoff condition).

Filtering of the alternator output voltage for transistor Q2 (first transistor 104) is provided by capacitors C5, C6 (first capacitor 106, and second capacitor 108) in the form of a low pass network filter. Flasher supply voltage is controlled and filtered through the oscillator power filters C3, C4 (fourth capacitor 116 and third capacitor 114), and the flasher voltage controllers R3, R5 (second resistor 122 and third resistor 128).

Flasher control timing is provided by the flasher on/off timing circuit R1, R2, C1 (fourth resistor 130, fifth resistor 132 and sixth capacitor 120). In one implementation, the flasher on/off timer controls the flasher (IC 126) at a rate of approximately 2.18 cycles per second, and controls the flasher amplifier Q3 (second transistor 124) at a duty cycle of approximately 0.3 seconds on, and 0.15 seconds off.

The output of the flasher (IC 126) is connected to the base of the flasher amplifier Q3 (second transistor 124) through a coupling timer capacitor C2 (fifth capacitor 118) that keeps the flashing rate steady.

A number of embodiments of the invention have been described. Nevertheless, it may be understood that various modifications may be made without departing from the spirit and scope of the invention. Accordingly, other embodiments are within the scope of the following claims.

What is claimed is:

1. A fault detector for determining a charge system fault in a motor vehicle charging system using an existing warning indicator on a display panel of the motor vehicle, the fault detector comprising:
    a charge isolator receiving as an input a signal indicative of the charge voltage provided from an alternator of the motor vehicle to the battery;
    a charge power loss detector operable to determine when a voltage level of the input signal is less than a predetermined threshold;
    a flasher operable to generate a pulsed signal if the voltage level of the input signal is less than the predetermined threshold; and
    signaling logic operable to
        transmit the pulsed signal to an existing warning indicator on a display panel of the motor vehicle,
        detect a fault associated with the existing warning signal, and
        prioritize between the fault and the charge system fault including selecting a higher priority fault to drive the existing warning indicator.

2. The fault detector of claim 1 further comprising a flasher timer for controlling a duty cycle of the pulsed signal.

3. The fault detector of claim 1 further comprising
    motor vehicle shut-off logic for detecting when the motor vehicle is not operating, and
    flasher power shut-off logic for shutting down the flasher when the motor vehicle is not operating.

4. The fault detector of claim 1 further comprising a flasher amplifier operable to receive the pulsed signal and drive the existing warning indictor at a steady rate.

5. The fault detector of claim 1 wherein the flasher is an integrated circuit.

6. The fault detector of claim 5 wherein the fault detector is a CMOS integrated circuit operating as a monolithic timer in an astable configuration.

7. The fault detector of claim 1 wherein the motor vehicle is a motorcycle.

8. The fault detector of claim 1 wherein the existing warning indicator is a low oil pressure indicator.

9. The fault detector of claim 1 wherein the charge isolator is a rectifier isolation diode.

10. The fault detector of claim 1 wherein the signaling logic is operable to transmit the pulsed signal to an existing warning indicator on a display panel of the motor vehicle if a charge system fault is detected and disable the transmission of the pulsed signal to the existing warning signal if the fault associated with the existing warning indicator is detected.

11. The fault detector of claim 1 wherein the fault associated with the existing warning indicator is a low oil pressure fault.

12. The fault detector of claim 1 wherein the oil pressure fault has a higher priority than a charging system fault.

13. The fault detector of claim 1 wherein the charger isolator is operable to isolate the charging system from the motor vehicle's load and a battery.

14. The fault detector of claim 1 wherein the charger isolator is operable to current limit received signals.

15. The fault detector of claim 1 wherein motor vehicle is selected from the group of a motorcycle, a motorboat, a snowmobile and an Altra-lite aircraft.

16. The fault detector of claim 1 wherein the existing warning indicator is selected from the group of a low oil pressure indicator, a high oil temperature indicator, a high water temperature indicator and a low fuel indicator.

17. A method for detecting a charging system fault in a motor vehicle, the motor vehicle including a low oil pressure warning indicator for indicating when oil pressure for the motor vehicle is too low, the method comprising detecting a charge system fault;

determining if the oil pressure is too low; and if so, driving the low oil pressure warning indicator with a first signal; and if the oil pressure is within an acceptable range, and if a charging system fault is detected, driving the low oil pressure warning indicator with a second signal that is distinct from the first signal used to drive the low oil pressure warning indicator when oil pressure is too low.

18. A method for detecting a charging system fault in a motor vehicle, the motor vehicle including an existing warning indicator driven by a first signal for indicating when one aspect of the motor vehicle performance is faulty, the method comprising detecting a charge system fault;

determining if the one aspect of the motor vehicle's performance is faulty and, if so, driving the existing warning indicator with the first signal; and if the one aspect is not faulty and a charge system fault has been detected, driving the existing warning indicator with a second signal corresponding to the detected charge system fault, the second signal providing a different visual indication than the first signal.

* * * * *